Dec. 25, 1962 R. A. SANFORD 3,069,897
CHROMATOGRAPHIC ANALYSIS
Filed Feb. 19, 1959
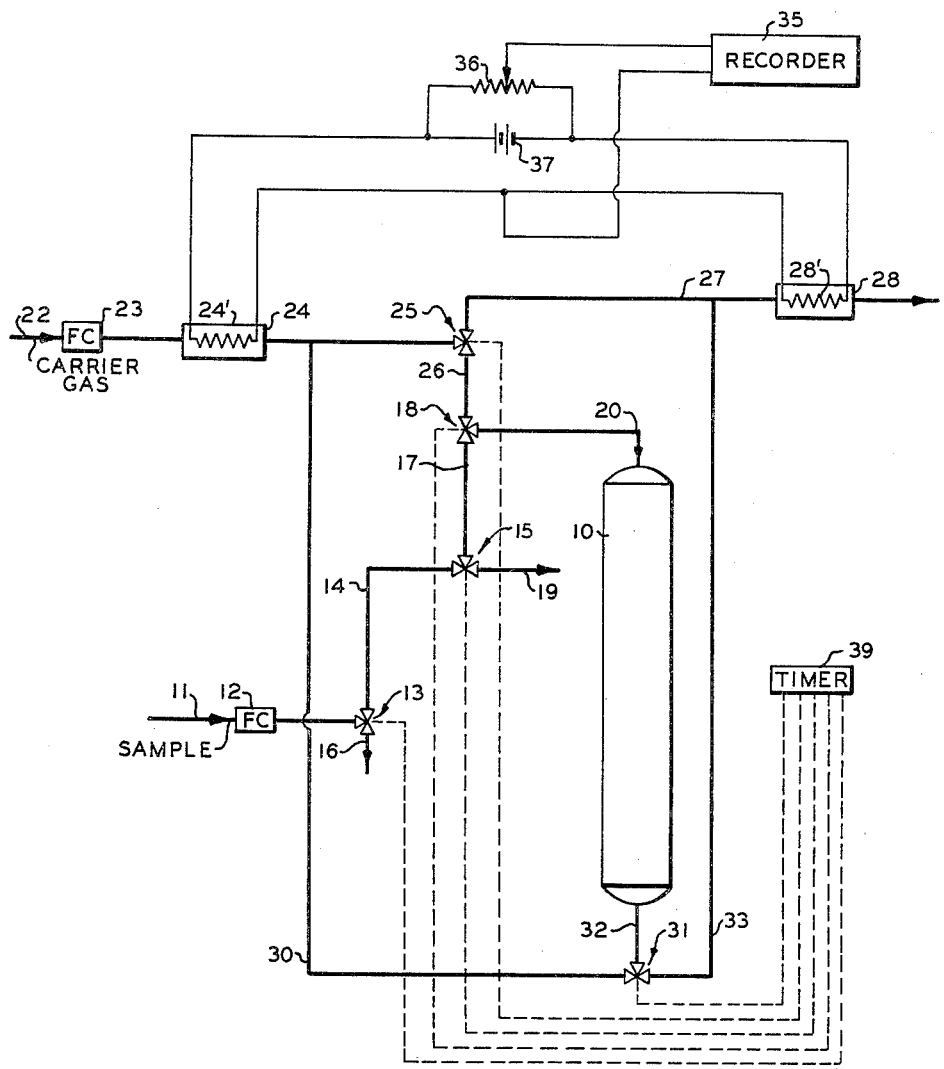
INVENTOR.
R.A. SANFORD
BY Hudson & Young
ATTORNEYS

United States Patent Office 3,069,897
Patented Dec. 25, 1962

3,069,897
CHROMATOGRAPHIC ANALYSIS
Richard A. Sanford, Bartlesville, Okla., assignor to Phillips Petroleum Company, a corporation of Delaware
Filed Feb. 19, 1959, Ser. No. 794,385
6 Claims. (Cl. 73—23)

This invention relates to the analysis of fluid streams.

In various industrial and laboratory operations, there is a need for analytical procedures which are capable of measuring small concentrations of constituents of fluid mixtures. One analytical procedure which presently is becoming quite valuable for fluid analysis involves elution chromatography. In elution chromatography, a sample of the material to be separated is introduced into a column which contains a selective sorbent. A carrier gas is directed into the column so as to force the sample material through the column. The sorbent attempts to hold the constituents of the sample, whereas the carrier gas tends to carry the constituents through the column. This results in the several constituents of the fluid mixture traveling through the column at different rates of speed, depending upon their affinities for the packing material. The column effluent thus consists initially of the carrier gas alone; the individual constituents of the fluid mixture appear later at spaced time intervals. It is common practice to detect these constituents by means of a thermal conductivity analyzer which compares the thermal conductivity of the effluent gas with the thermal conductivity of the carrier gas directed to the column.

After the analysis of a fluid sample has been made, it is customary to direct a purge gas, which can be the carrier gas, through the column to remove all of the remaining constitutents of the fluid sample. This purge period normally is longer than the actual analysis cycle so that a substantial period of time occurs before the analyzer is capable of being employed for a second analysis. In many industrial operations, analyses must be made repeatedly in order to provide the necessary information for control purposes. It has been proposed to employ a plurality of columns in sequence so that substantially continuous analyses are obtained. While this structure is generally acceptable, it does have certain disadvantages. The analyses obtained from a single chromatographic analyzer column are generally more consistent and the operating procedure is simplified.

The present invention relates to a procedure whereby a chromatographic column can be utilized to provide a series of analyses in a minimum amount of time. It has been discovered that the column need not be completely back purged of sample. It is necessary to back purge the column only long enough to allow the next sample to be absorbed on the inlet portion with enough column remaining for the separation. For a continuous duty analyzer, a controlled back purge for a relatively short time will permit subsequent analyses to be made at a constant level. Thus, the present invention provides a method for reducing the total time required for analyses by chromatography.

Accordingly, it is an object of this invention to provide an improved procedure for analyzing fluid streams.

A further object is to provide a procedure for reducing the time required between a series of analyses by a chromatographic column.

Other objects, advantages and features of the invention should become apparent from the following detailed description, taken in conjunction with the accompanying drawing which is a schematic representation of a chromatographic analyzer that can be employed to carry out the method of this invention.

Referring now to the drawing in detail, there is shown a column 10 which is filled with packing material. A gas sample to be analyzed is introduced into the system through a conduit 11 which has a flow controller 12 therein. Conduit 11 communicates with a valve 13. When valve 13 is in a first position, conduit 11 communicates with a conduit 14 which in turn communicates with a valve 15. When valve 13 is in the second position, conduit 11 communicates with a vent conduit 16. When valve 15 is in a first position, conduit 14 communicates with a conduit 17 which in turn communicates with a valve 18. When valve 15 is in the second position, conduit 17 communicates with a vent conduit 19. When valve 18 is in a first position, conduit 17 communicates with a conduit 20 which in turn communicates with the inlet of column 10.

A carrier gas is introduced into the system through a conduit 22 which has a flow controller 23 and a thermal conductivity cell 24 therein. Conduit 22 communicates with a valve 25. When valve 25 is in a first position, conduit 22 communicates with a conduit 26 which in turn communicates with the third port of valve 18. When valve 18 is in the second position, conduits 20 and 26 are in communication. When valve 25 is in the second position, conduit 22 is in communication with a vent conduit 27 which has a second thermal conductivity cell 28 therein. A conduit 30 communicates between conduit 22 downstream from cell 24 and one port of a valve 31. A conduit 32 communicates between the outlet of column 10 and a second port of valve 31. A conduit 33 communicates between a third port of valve 31 and vent conduit 27 upstream from cell 28. Conduits 32 and 33 are in communication when valve 31 is in a first position, and conduits 30 and 32 are in communication when valve 31 is in a second position.

Thermal conductivity cells 24 and 28 have respective thermistors 24' and 28' therein which are in thermal contact with the gas flowing through respective conduits 22 and 27. The first terminals of thermistors 24' and 28' are connected to one another and to the first input terminal of a recorder 35. The second terminals of thermistors 24' and 28' are connected to the respective end terminals of a potentiometer 36, the contactor of which is connected to the second input terminal of recorder 35. A voltage source 37 is connected across the end terminals of potentiometer 36.

It should be evident that thermistors 24' and 28' and the circuit elements associated therewith form a Wheatstone bridge network so that the signal applied to recorder 35 is representative of the differences between the thermal conductivities of the gases in contact with respective thermistors 24' and 28'. Recorder 35 thus provides a signal which indicates differences between compositions of gases flowing through conduits 22 and 27. While thermal conductivity cells can be employed to advantage to make this comparison, other gas composition measuring means known in the art, such as infrared analysis, for example, can also be employed.

Valves 13, 15, 18, 25 and 31 are operated in the sequence described hereinafter by means of a timer 39. These valves can advantageously be solenoid operated so that the valves are in first positions when the associated solenoids are energized and are in second positions when the solenoids are deenergized. Timer 39 can comprise a series of cam-operated switches which supply energizing current to the solenoids of the valves. The cams which operate the switches of timer 39 can be carried by the shaft of a constant speed motor. However, the operation of the analyzer of this invention is not restricted to any specific valve structure because rotary selector valves, which are known in the art, can be employed to provide the desired switching of the fluid streams.

In order to describe the operation of the analyzer of this invention, reference will be made to the detection of impurities in an ethylene stream. The sample stream comprises ethylene having a purity greater than approximately 99 percent. The impurities include hydrogen, which is present in a concentration of the order of 10 to 30 parts per million; air, which is present in a concentration of approximately 100 parts per million; carbon monoxide, which is present in a concentration of approximately two parts per million; methane, which is present in a concentration of approximately 0.05 to 0.2 percent; and ethane, which has a concentration of several tenths of one percent. Column 10 is approximately fifteen feet in length and has an internal diameter of approximately 0.2 inch. The first nine feet of column 10 (adjacent the inlet) is filled with a molecular sieve material comprising a dehydrated zeolite. This material is in the form of cylindrical pellets approximately 1/16 inch in diameter and approximately 1/8 inch long. The remainder column 10 is filled with particles of activated coconut charcoal of approximately 20 to 30 mesh. Helium is supplied as the carrier gas at a rate of approximately 100 cubic centimeters per minute. It is desirable that column 10 be maintained at a relatively constant temperature, which can be slightly above ambient temperature.

At the beginning of an analysis cycle, the valves are positioned so that the gas sample flows through conduits 11, 14, 17 and 20, column 10, and conduits 32, 33 and 27 to vent. The carrier gas flows through conduits 22 and 27 to vent. The gases flow through these paths for approximately five minutes so that approximately 500 cubic centimeters of sample is introduced into column 10. The valves are then switched by timer 39 so that the sample is vented through conduit 16 and the carrier gas in introduced into column 10 through conduits 22, 26 and 20. The effluent from column 10 is removed through conduits 32, 33 and 27. At this time, recorder 35 indicates the difference between the thermal conductivities of the carrier gas which is introduced into the column and the effluent gas from the column. This elution period continues for approximately five minutes, during which time the constituents of the sample gas appear in the effluent from the column in the following order: hydrogen, oxygen, nitrogen and carbon monoxide. These are the principal constituents of interest. At the end of this five minute period, the valves are again switched by timer 39 so that the carrier gas enters column 10 through conduits 22, 30 and 32 and is vented from the column through conduits 20, 17 and 19. The sample gas continues to be vented through conduit 16. This purge operation continues for approximately ten to twelve minutes, after which time the column is ready for a second analysis.

The ten to twelve minute purge period described above is not sufficient to remove all of the sample gas from the column. However, it has been found that a complete removal of all of this gas is not necessary. All of the minor constituents which are to be detected have been eluted so that subsequent analyses for these constituents can be made. This is the essence of the present invention. With constant flow rates, the purge times between subsequent analyses generally should be the same.

It should be evident that the particular packing material employed in column 10 and the particular carrier gas can vary widely depending upon the type of sample to be analyzed. Examples of materials which can be employed to advantage for the packing include absorbents such as silica gel, alumina and charcoal. The column can also be filled with a partition material such as a crushed inert solid coated by a solvent such as hexadecane or benzyl ether. The combination of the zeolite and the charcoal are employed to advantage in the described example. The inlet section of the column effectively concentrates the trace constituents to be detected, whereas the outlet section of the column provides the desired separation. This results in the carbon monoxide appearing ahead of the methane so that it can readily be detected.

In the example described above, column 10 actually forms "two" columns due to the different materials in the two sections. The inlet section can be considered as a concentration column, which normally is filled with an adsorbent, and the outlet section can be considered as an elution column, which is filled with either an adsorbent or a supported absorbent. A frontal separation is thus made in the inlet section when a large sample gas volume is employed. In such a situation, the purge gas volume must be such that as much sample is purged from the elution column each cycle as enters this column in each cycle during the elution period. Thus:

$$Q_e = \int_{t_0}^{t_1} F_e C_e dt = Q_p = \int_{t_1}^{t_2} F_p C_e dt$$

where:

$Q_e$=quantity of major component eluted to elution column
$Q_p$=quantity of major component purged from elution column
$t_0$=time at start of elution period
$t_1$=time at end of elution period and start of purge period
$t_2$=time at end of purge period
$F_e$=elution flow rate
$F_p$=purge flow rate
$C_e$=vapor concentration of major component at elution column inlet.

On the first run with a fresh column, the above relationship does not hold true. However, after the elution column is contaminated somewhat, equilibrium is reached and this relationship holds true. Under equilibrium conditions the amount of major component back purged from the concentrator column must be equal to the amount of major component in the sample each cycle:

$$Q_p' = \int_{t_1}^{t_3} F_p C_c dt = Q_s$$

where:

$Q_p'$=quantity of major component purged from concentrator column
$t_3$=time at end of concentrator column purge
$C_c$=vapor concentration of major component at concentrator column inlet
$Q_s$=quantity of major component in the sample.

When the elution and concentrator columns are connected, the purge rates and times for both columns are the same. Therefore, the purge time must be the larger of the quantities $t_2-t_1$ and $t_3-t_1$.

While the invention has been described in conjunction with a present preferred embodiment, it should be evident that it is not limited thereto.

What is claimed is:

1. In a method of detecting the presence of trace amounts of carbon monoxide in a gaseous stream comprising primarily ethylene, together with trace amounts of hydrogen, oxygen and nitrogen, which comprises passing such a fluid sample to be analyzed to the inlet of a first zone which contains a zeolite, terminating the flow of sample to said first zone after a predetermined volume of sample has been introduced into said first zone, passing a carrier gas to the inlet of said first zone and passing the effluent from the outlet of said first zone to the inlet of a second zone which contains charcoal, measuring a property of the effluent from the outlet of said second zone, terminating the flow of carrier gas to said first zone, passing a purge gas through said second zone from the outlet to the inlet thereof and then through said first zone from the outlet to the inlet thereof and wherein in the operation, it has been the practice to substantially completely purge said first zone to substantially completely free said first zone of ethylene prior to again placing a further sample of fluid thereinto for a further analysis to determine the presence of said trace amounts of carbon monoxide, the improvement which is characterized by the fact that the initial purge step is conducted to remove only a portion of the sample remaining in said first zone after said measurement, thus leaving in said first zone a substantial portion of said predetermined volume of sample which was introduced into said first zone, and in that in each subsequent purge step, an amount of said ethylene is removed from said first zone which is substantially equal only to the amount of the ethylene introduced into said first zone in a further sample, and then repeating the operation.

2. In a method of detecting repeatedly a trace constituent in a fluid mixture with a major component which comprises passing such a fluid sample to the inlet of an adsorption zone, terminating the flow of sample to said adsorption zone after a predetermined volume of sample has been introduced therein, passing a carrier gas to the inlet of said adsorption zone and passing the effluent from the outlet of said adsorption zone to the inlet of a sorption zone, said carrier gas being effective to remove at different rates from said sorption zone the several constituents of the fluid mixture depending on their affinities for the sorption zone, said trace constituent being eluted from said sorption zone prior to the removal of any substantial quantity of the major component from said sorption zone, measuring a property of the effluent from the outlet of said sorption zone, terminating the flow of carrier gas to said adsorption zone, and passing a purge gas into the outlet of said sorption zone and then through said sorption zone from the outlet to the inlet thereof and then through said adsorption zone from the outlet to the inlet thereof for a time sufficient to substantially completely purge said major component, the improvement which is characterized in that in lieu of substantially completely purging said adsorption zone an initial purge step is conducted to remove only a portion of the fluid sample remaining in said adsorption zone after said steps, except the purge step, have been effected, thus leaving in said adsorption zone a substantial portion of said fluid sample originally introduced into said adsorption zone, and further characterized in that in each subsequent purge step an amount of said major component is removed from said adsorption zone which is substantially equal only to the amount of said major component introduced into said adsorption zone in a further sample and then repeating the operation.

3. The method of claim 2 wherein said purge gas is said carrier gas.

4. The method of claim 2 wherein said purge gas is passed through said sorption zone for a period of time only sufficient to purge as much fluid sample from said sorption zone following each analysis as is introduced into said sorption zone during the preceding sample introduction step.

5. In a method of analyzing a fluid mixture which comprises passing a fluid sample to be analyzed for a small constituent thereof to the inlet of an adsorption zone, terminating the flow of sample to said adsorption zone, passing a carrier gas to the inlet of said adsorption zone, and passing the effluent from said adsorption zone to the inlet of a sorption zone, measuring a property of the effluent from the sorption zone, said carrier gas being effective to remove at different rates from said sorption zone the several constituents of the fluid sample depending on their affinities for said sorption zone, said minor constituent being eluted from said sorption zone prior to the removal of any substantial quantity of the principal constituent of said fluid sample from said sorption zone, terminating the flow of carrier gas to said adsorption zone, passing a purge gas through said sorption zone, and then through said adsorption zone, and wherein said purge gas has been passed through said zones for a time sufficient to substantially completely purge all sample constituents from said adsorption zone, the improvement which is characterized by the fact that an initial purge step is conducted to remove only a portion of the fluid sample remaining in said zone after the analysis preceding said initial purge step, thus leaving in said adsorption zone a substantial portion of the fluid sample introduced into said adsorption zone prior to said initial purge step, and further characterized in that in each subsequent purge step an amount of the fluid sample constituents is removed from said zone which is substantially equal only to the amount of said fluid sample constituents introduced into said zone in a fluid sample introduced after said initial purge step, and then repeating the operation.

6. In a method for repeatedly detecting the presence and measuring a property of a trace constituent in a fluid mixture by using samples of said fluid mixture, comprising said constituent and a principal constituent, wherein, after a predetermined volume of the sample fluid has been introduced into an adsorbent in an adsorption zone, a carrier gas, effective to remove at different rates from said adsorbent, the several constituents of the fluid, mixture depending on their affinities for said adsorbent, said trace constituent being eluted from said adsorbent prior to the removal of any substantial quantity of the principal constituent from said adsorbent in said adsorption zone, is passed into the inlet of and through said zone and there is measured a property of the effluent from the outlet of said zone thus obtained, flow of carrier gas is terminated after the measurement of said property has been made and a purge gas is passed after each said measurement through said zone from the outlet to the inlet end thereof, and wherein in the operation it has been practice to substantially completely back-purge said zone to substantially completely free said zone of said principal constituent prior to again placing a further sample of fluid mixture thereinto for a further detection and measurement of a property of said trace constituent, all said steps being effected in known manner, as herein described, the improvement which is characterized by the fact that the initial back-purge step is conducted to remove only a portion of the fluid mixture remaining in said zone after said measurement, thus leaving in said zone a substantial portion of said predetermined volume of the sample fluid, and in that in each subsequent back-purge step an amount of said principal constituent is removed from said zone which is substantially equal only to the amount of said principal constituent introduced into said zone in said further sample, and then repeating the operation.

References Cited in the file of this patent

UNITED STATES PATENTS 2,833,151    Harvey _____ May 6, 1958
2,841,005    Coggeshall _____ July 1, 1958

OTHER REFERENCES

Article: "Gas Partition Analysis of Light Ends in Gasolines" by Lichtenfels et al. Published in Analytical Chemistry, vol. 28, pages 1376–1379, September 1956.

Article in Analytical Chemistry, vol. 30, No. 11, November 1958, pages 1859–1862 by John J. Madison.